(12) United States Patent  
Colgrove et al.

(10) Patent No.: US 11,704,036 B2  
(45) Date of Patent: *Jul. 18, 2023

(54) DEDUPLICATION DECISION BASED ON METRICS

(71) Applicant: PURE STORAGE, INC., Mountain View, CA (US)

(72) Inventors: John Colgrove, Los Altos, CA (US); Ronald Karr, Palo Alto, CA (US); Ethan L. Miller, Santa Cruz, CA (US)

(73) Assignee: PURE STORAGE, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/194,119

(22) Filed: Nov. 16, 2018

(65) Prior Publication Data

US 2019/0087117 A1 Mar. 21, 2019

Related U.S. Application Data

(63) Continuation of application No. 15/333,903, filed on Oct. 25, 2016, now Pat. No. 10,133,503.
(Continued)

(51) Int. Cl.
*G06F 12/00* (2006.01)
*G06F 3/06* (2006.01)
(Continued)

(52) U.S. Cl.
CPC .......... *G06F 3/0641* (2013.01); *G06F 3/061* (2013.01); *G06F 3/0619* (2013.01);
(Continued)

(58) Field of Classification Search
CPC .................. G06F 3/0641; G06F 3/061; G06F 2212/1016; G06F 3/0619; G06F 3/0665;
(Continued)

(56) References Cited

U.S. PATENT DOCUMENTS 5,208,813 A 5/1993 Stallmo
5,403,639 A 4/1995 Belsan
(Continued)

FOREIGN PATENT DOCUMENTS

CN 103370685 A 10/2013
CN 103370686 A 10/2013
(Continued)

OTHER PUBLICATIONS

Microsoft Corporation, "GCSeitings.IsServerGC Property", Retrieved Oct. 27, 2013 via the WayBack Machine, 3 pages.
(Continued)

*Primary Examiner* — David Yi
*Assistant Examiner* — Tahilba O Puche (57) ABSTRACT

Systems and method for implementing deduplication process based on performance analyses. The system may include a processing device to determine a first performance metric associated with retrieving a second stored data block that is within a specified range of a duplicate of the first data block and a second performance metric associated with retrieving a hash value corresponding to the second stored data block. The processing device further to retrieve the second stored data block within a specified range of the duplicate of the first data block in response to the first performance metric not exceeding the second performance metric.

14 Claims, 7 Drawing Sheets

Related U.S. Application Data (60) Provisional application No. 62/330,728, filed on May 2, 2016.

(51) Int. Cl.
  *G06F 12/1018* (2016.01)
  *G06F 16/22* (2019.01)
  *G06F 16/25* (2019.01)
  *G06F 16/23* (2019.01)

(52) U.S. Cl.
  CPC .......... *G06F 3/0665* (2013.01); *G06F 3/0689* (2013.01); *G06F 12/1018* (2013.01); *G06F 16/2255* (2019.01); *G06F 16/2365* (2019.01); *G06F 16/258* (2019.01)

(58) Field of Classification Search
  CPC .............. G06F 3/0689; G06F 12/1018; G06F 16/1748; G06F 16/24545; G06F 16/137; H04L 43/08
  See application file for complete search history.

(56) References Cited

U.S. PATENT DOCUMENTS

| | | | |
|---|---|---|---|
| 5,940,838 | A | 8/1999 | Schmuck et al. |
| 6,263,350 | B1 | 7/2001 | Wollrath et al. |
| 6,412,045 | B1 | 6/2002 | DeKoning et al. |
| 6,718,448 | B1 | 4/2004 | Ofer |
| 6,757,769 | B1 | 6/2004 | Ofer |
| 6,799,283 | B1 | 9/2004 | Tamai et al. |
| 6,834,298 | B1 | 12/2004 | Singer et al. |
| 6,850,938 | B1 | 2/2005 | Sadjadi |
| 6,915,434 | B1 | 7/2005 | Kuroda |
| 6,973,549 | B1 | 12/2005 | Testardi |
| 7,028,216 | B2 | 4/2006 | Aizawa et al. |
| 7,028,218 | B2 | 4/2006 | Schwarm et al. |
| 7,039,827 | B2 | 5/2006 | Meyer et al. |
| 7,216,164 | B1 | 5/2007 | Whitmore et al. |
| 7,783,682 | B1 | 8/2010 | Patterson |
| 7,873,619 | B1 | 1/2011 | Faibish et al. |
| 7,913,300 | B1 | 3/2011 | Flank et al. |
| 7,933,936 | B2 | 4/2011 | Aggarwal et al. |
| 7,979,613 | B2 | 7/2011 | Zohar et al. |
| 7,996,371 | B1 * | 8/2011 | Deshmukh .......... G06F 16/1748 707/692 |
| 8,086,652 | B1 | 12/2011 | Bisson et al. |
| 8,117,464 | B1 | 2/2012 | Kogelnik |
| 8,200,887 | B2 | 6/2012 | Bennett |
| 8,205,065 | B2 | 6/2012 | Matze |
| 8,352,540 | B2 | 1/2013 | Anglin et al. |
| 8,527,544 | B1 | 9/2013 | Colgrove et al. |
| 8,560,747 | B1 | 10/2013 | Tan et al. |
| 8,621,241 | B1 | 12/2013 | Stephenson |
| 8,700,875 | B1 | 4/2014 | Barron et al. |
| 8,751,463 | B1 | 6/2014 | Chamness |
| 8,806,160 | B2 | 8/2014 | Colgrove et al. |
| 8,874,850 | B1 | 10/2014 | Goodson et al. |
| 8,959,305 | B1 | 2/2015 | Lecrone et al. |
| 9,081,713 | B1 | 7/2015 | Bennett |
| 9,189,334 | B2 | 11/2015 | Bennett |
| 9,311,182 | B2 | 4/2016 | Bennett |
| 9,423,967 | B2 | 8/2016 | Colgrove et al. |
| 9,436,396 | B2 | 9/2016 | Colgrove et al. |
| 9,436,720 | B2 | 9/2016 | Colgrove et al. |
| 9,454,476 | B2 | 9/2016 | Colgrove et al. |
| 9,454,477 | B2 | 9/2016 | Colgrove et al. |
| 9,513,820 | B1 | 12/2016 | Shalev |
| 9,516,016 | B2 | 12/2016 | Colgrove et al. |
| 9,552,248 | B2 | 1/2017 | Miller et al. |
| 9,632,870 | B2 | 4/2017 | Bennett |
| 9,639,543 | B2 * | 5/2017 | Li .......................... G06F 16/11 |
| 9,753,938 | B2 * | 9/2017 | Mallaiah ................ G06F 3/0608 |
| 9,846,718 | B1 * | 12/2017 | Ruef ....................... G06F 3/0641 |
| 2002/0038436 | A1 | 3/2002 | Suzuki |
| 2002/0087544 | A1 | 7/2002 | Selkirk et al. |
| 2002/0178335 | A1 | 11/2002 | Selkirk et al. |
| 2003/0140209 | A1 | 7/2003 | Testardi |
| 2004/0049572 | A1 | 3/2004 | Yamamoto et al. |
| 2005/0066095 | A1 | 3/2005 | Mullick et al. |
| 2005/0216535 | A1 | 9/2005 | Saika et al. |
| 2005/0223154 | A1 | 10/2005 | Uemura |
| 2006/0074940 | A1 | 4/2006 | Craft et al. |
| 2006/0136365 | A1 | 6/2006 | Kedem et al. |
| 2006/0155946 | A1 | 7/2006 | Ji |
| 2007/0067585 | A1 | 3/2007 | Ueda et al. |
| 2007/0109856 | A1 | 5/2007 | Pellicone et al. |
| 2007/0113007 | A1 | 5/2007 | Murayama et al. |
| 2007/0162954 | A1 | 7/2007 | Pela |
| 2007/0171562 | A1 | 7/2007 | Maejima et al. |
| 2007/0174673 | A1 | 7/2007 | Kawaguchi et al. |
| 2007/0220313 | A1 | 9/2007 | Katsuragi et al. |
| 2007/0245090 | A1 | 10/2007 | King et al. |
| 2007/0266179 | A1 | 11/2007 | Chavan et al. |
| 2008/0059699 | A1 | 3/2008 | Kubo et al. |
| 2008/0065852 | A1 | 3/2008 | Moore et al. |
| 2008/0126734 | A1 | 5/2008 | Murase |
| 2008/0134174 | A1 | 6/2008 | Sheu et al. |
| 2008/0155191 | A1 | 6/2008 | Anderson et al. |
| 2008/0178040 | A1 | 7/2008 | Kobayashi |
| 2008/0209096 | A1 | 8/2008 | Lin et al. |
| 2008/0244205 | A1 | 10/2008 | Amano et al. |
| 2008/0275928 | A1 | 11/2008 | Shuster |
| 2008/0282045 | A1 | 11/2008 | Biswas et al. |
| 2008/0285083 | A1 | 11/2008 | Aonuma |
| 2008/0307270 | A1 | 12/2008 | Li |
| 2009/0006587 | A1 | 1/2009 | Richter |
| 2009/0037662 | A1 | 2/2009 | La Frese et al. |
| 2009/0043958 | A1 | 2/2009 | Kaneda et al. |
| 2009/0204858 | A1 | 8/2009 | Kawaba |
| 2009/0228648 | A1 | 9/2009 | Wack |
| 2009/0300084 | A1 | 12/2009 | House |
| 2010/0057673 | A1 | 3/2010 | Savov |
| 2010/0058026 | A1 | 3/2010 | Heil et al. |
| 2010/0067706 | A1 | 3/2010 | Anan et al. |
| 2010/0077205 | A1 | 3/2010 | Ekstrom et al. |
| 2010/0082879 | A1 | 4/2010 | McKean et al. |
| 2010/0106905 | A1 | 4/2010 | Kurashige et al. |
| 2010/0153620 | A1 | 6/2010 | McKean et al. |
| 2010/0153641 | A1 | 6/2010 | Jagadish et al. |
| 2010/0191897 | A1 | 7/2010 | Zhang et al. |
| 2010/0250802 | A1 | 9/2010 | Waugh et al. |
| 2010/0250882 | A1 | 9/2010 | Hutchison et al. |
| 2010/0281225 | A1 | 11/2010 | Chen et al. |
| 2010/0287327 | A1 | 11/2010 | Li et al. |
| 2011/0072300 | A1 | 3/2011 | Rousseau |
| 2011/0121231 | A1 | 6/2011 | Haas et al. |
| 2011/0145598 | A1 | 6/2011 | Smith et al. |
| 2011/0161559 | A1 | 6/2011 | Yurzola et al. |
| 2011/0167221 | A1 | 7/2011 | Pangal et al. |
| 2011/0238634 | A1 | 9/2011 | Kobara |
| 2012/0023375 | A1 | 1/2012 | Dutta et al. |
| 2012/0036309 | A1 | 2/2012 | Dillow et al. |
| 2012/0117029 | A1 | 5/2012 | Gold |
| 2012/0191670 | A1 * | 7/2012 | Kennedy ............. G06F 16/1748 707/692 |
| 2012/0198175 | A1 | 8/2012 | Atkisson |
| 2012/0257626 | A1 * | 10/2012 | McGhee ................ H04L 43/028 370/392 |
| 2012/0330954 | A1 | 12/2012 | Sivasubramanian et al. |
| 2013/0042052 | A1 | 2/2013 | Colgrove et al. |
| 2013/0046995 | A1 | 2/2013 | Movshovitz |
| 2013/0047029 | A1 | 2/2013 | Ikeuchi et al. |
| 2013/0086006 | A1 * | 4/2013 | Colgrove ............. G06F 16/1752 707/692 |
| 2013/0091102 | A1 | 4/2013 | Nayak |
| 2013/0205110 | A1 | 8/2013 | Kettner |
| 2013/0227236 | A1 | 8/2013 | Flynn et al. |
| 2013/0275391 | A1 | 10/2013 | Batwara et al. |
| 2013/0275656 | A1 | 10/2013 | Talagala et al. |
| 2013/0283058 | A1 | 10/2013 | Fiske et al. |
| 2013/0290648 | A1 | 10/2013 | Shao et al. |
| 2013/0318314 | A1 | 11/2013 | Markus et al. |
| 2013/0339303 | A1 | 12/2013 | Potter et al. |

(56) References Cited

U.S. PATENT DOCUMENTS

| | | |
|---|---|---|
| 2014/0052946 A1 | 2/2014 | Kimmel |
| 2014/0068791 A1 | 3/2014 | Resch |
| 2014/0089730 A1 | 3/2014 | Watanabe et al. |
| 2014/0101361 A1 | 4/2014 | Gschwind |
| 2014/0122818 A1* | 5/2014 | Hayasaka .............. G06F 3/0641 711/162 |
| 2014/0143517 A1 | 5/2014 | Jin et al. |
| 2014/0172929 A1 | 6/2014 | Sedayao et al. |
| 2014/0201150 A1 | 7/2014 | Kumarasamy et al. |
| 2014/0215129 A1 | 7/2014 | Kuzmin et al. |
| 2014/0229131 A1 | 8/2014 | Cohen et al. |
| 2014/0229452 A1 | 8/2014 | Serita et al. |
| 2014/0281308 A1 | 9/2014 | Lango et al. |
| 2014/0325115 A1 | 10/2014 | Ramsundar et al. |
| 2015/0234709 A1 | 8/2015 | Koarashi |
| 2015/0244775 A1 | 8/2015 | Vibhor et al. |
| 2015/0278534 A1 | 10/2015 | Thiyagarajan et al. |
| 2016/0019114 A1 | 1/2016 | Han et al. |
| 2016/0098191 A1 | 4/2016 | Golden et al. |
| 2016/0098199 A1 | 4/2016 | Golden et al. |
| 2016/0259591 A1* | 9/2016 | Arikawa ................ G06F 3/0608 |
| 2017/0115883 A1* | 4/2017 | Muppalaneni ....... G06F 12/1009 |
| 2017/0123676 A1* | 5/2017 | Singhai ................ G06F 3/0679 |

FOREIGN PATENT DOCUMENTS

| | | |
|---|---|---|
| CN | 104025010 B | 11/2016 |
| EP | 3066610 A1 | 9/2016 |
| EP | 3082047 A1 | 10/2016 |
| EP | 3120235 A | 1/2017 |
| JP | 2007-087036 A | 4/2007 |
| JP | 2007-094472 A | 4/2007 |
| JP | 2008-250667 A | 10/2008 |
| JP | 2010-211681 A | 9/2010 |
| WO | WO-1995/002349 A1 | 1/1995 |
| WO | WO-1999/013403 A1 | 3/1999 |
| WO | WO-2008/102347 A1 | 8/2008 |
| WO | WO-2010/071655 A1 | 6/2010 |

OTHER PUBLICATIONS

Microsoft Corporation, "Fundamentals of Garbage Collection", Retrieved Aug. 30, 2013 via the WayBack Machine, 11 pages.

* cited by examiner

DEDUPLICATION DECISION BASED ON METRICS

RELATED APPLICATION

This application claims the benefit of U.S. application Ser. No. 15/333,903 filed Oct. 25, 2016, which claims the benefit under 35 U.S.C. § 119 § of U.S. Provisional Application 62/330,728 filed on May 2, 2016, which are hereby incorporated by reference.

TECHNICAL FIELD

The present disclosure is generally related to deduplication, and more particularly, to selecting a deduplication process based on a difference between performance metrics.

BACKGROUND

Data deduplication is a process to eliminate or remove redundant data to improve the utilization of storage resources. For example, during the deduplication process, blocks of data may be processed and stored. When a subsequent block of data is received, the subsequent block of data may be compared with the previously stored block of data. If the subsequent block of data matches with the previously stored block of data, then the subsequent block of data may not be stored in the storage resource. Instead, a pointer to the previously stored block of data may replace the contents of the subsequent block of data.

BRIEF DESCRIPTION OF THE DRAWINGS

The present disclosure is illustrated by way of example, and not by way of limitation and can be more fully understood with reference to the following detailed description when considered in connection with the figures as described below.

DETAILED DESCRIPTION

Aspects of the present disclosure relate to selecting a deduplication process based on a difference between performance metrics. For example, data blocks may be analyzed by a deduplication process to determine whether a duplicate or copy of the data block is currently stored at a storage system. The deduplication process may use a hash function that generates a hash value based on the data block. The generated hash value may be compared with hash values of a deduplication map that identifies currently stored data blocks at the storage system. If the generated hash value matches with any of the hash values in the deduplication map, then the data block may be considered to be a copy or duplicate of another data block that is currently stored at the storage system. Alternatively, the deduplication process may directly compare the received data block with another data block that is currently stored at the storage system. Thus, the deduplication process may be based on comparing a generated hash value with a hash value retrieved from a deduplication map or based on comparing a received data block with a retrieved data block that has been previously stored at the storage system.

The storage system may use either deduplication process to determine whether copies of received data blocks are currently stored at the storage system. For example, a series (i.e., stream) of data blocks may be received to be stored at the storage system. A first hash value may be generated for one of the data blocks of the series of data blocks and the generated hash value may be compared with hash values in a duplication map. If the first hash value matches with another hash value in the deduplication map, then the corresponding received data block of the series of data blocks may be considered a duplicate of another data block that is currently stored at the storage system.

Subsequently, a deduplication process may be used to determine whether the other data blocks of the series of data blocks are also duplicates of currently stored data blocks at the storage system. For example, the first deduplication process may be used to generate hash values for the other data blocks of the series and retrieve stored hash values associated with the other data blocks and currently stored in the deduplication map. The generated hash values may be compared with the retrieved hash values to determine whether the other data blocks of the series are duplicates of currently stored data blocks. Alternatively, the second deduplication process may be used to retrieve other stored data blocks that are associated with the stored data block and then compare the other received data blocks of the series with the other stored data blocks that have been retrieved to determine whether the other data blocks of the series are duplicates of the currently stored data blocks.

The first deduplication process and the second deduplication process may retrieve, respectively, the stored hash values and the other stored data blocks by retrieving the stored hash values and the stored data blocks from cache memory (i.e., a local memory) and a storage resource (i.e., a hacking storage) at the storage system. For example, a subset of the hash values or data blocks may be retrieved from the cache memory and another subset may be retrieved from the storage resource. The retrieving of the hash values or data blocks from the cache memory may take less time than the retrieving of the hash values or data blocks from the storage resource. Thus, depending on the number of hash values to be retrieved that are that are stored at the cache memory as opposed to the storage resource and the number of data blocks to be retrieved that are stored at the cache memory as opposed to the storage resource, the performance of the first deduplication process and the second deduplication process may vary. For example, at certain times, the first deduplication process may be more efficient and take less time than the second deduplication process, and vice versa at other times. Thus, if a particular deduplication process is selected to be used by the storage system, a less efficient and time consuming deduplication process may be selected while a more efficient and less time consuming deduplication process may be available to the storage system.

Aspects of the present disclosure address the above and other deficiencies by determining or calculating performance metrics for the deduplication processes. For example, a first performance metric may be determined for the first deduplication process and a second performance metric may be determined for the second deduplication process. As described in further detail below, the performance metrics may be based on whether the respective data blocks or hash values are stored in cache memory, the storage resource, size of the data blocks that are to be retrieved, the number of data blocks that are to be retrieved, performance characteristics of the storage system, etc. If the first performance metric of the first deduplication process does not exceed the second performance metric of the second deduplication process (e.g., the first and second performance metrics predict less time for performing the first deduplication process as opposed to the second deduplication process) then the first deduplication process may be used to determine whether other data blocks of the series of data blocks received at the storage system are duplicates of currently stored data blocks at the storage system. Otherwise, if the second performance metric predicts that the second deduplication process may take less time to perform than the first performance metric, then the second deduplication process may be used to determine whether the other data blocks of the series of data blocks are duplicates of currently stored data blocks.

Thus, the present disclosure may improve the performance of a storage system by determining performance metrics for performing operations of deduplication processes. For example, the deduplication process that may perform a deduplication operation for data blocks faster than another deduplication process may be selected for use by the storage system when appropriate as based on the performance metrics.

Figure 1:
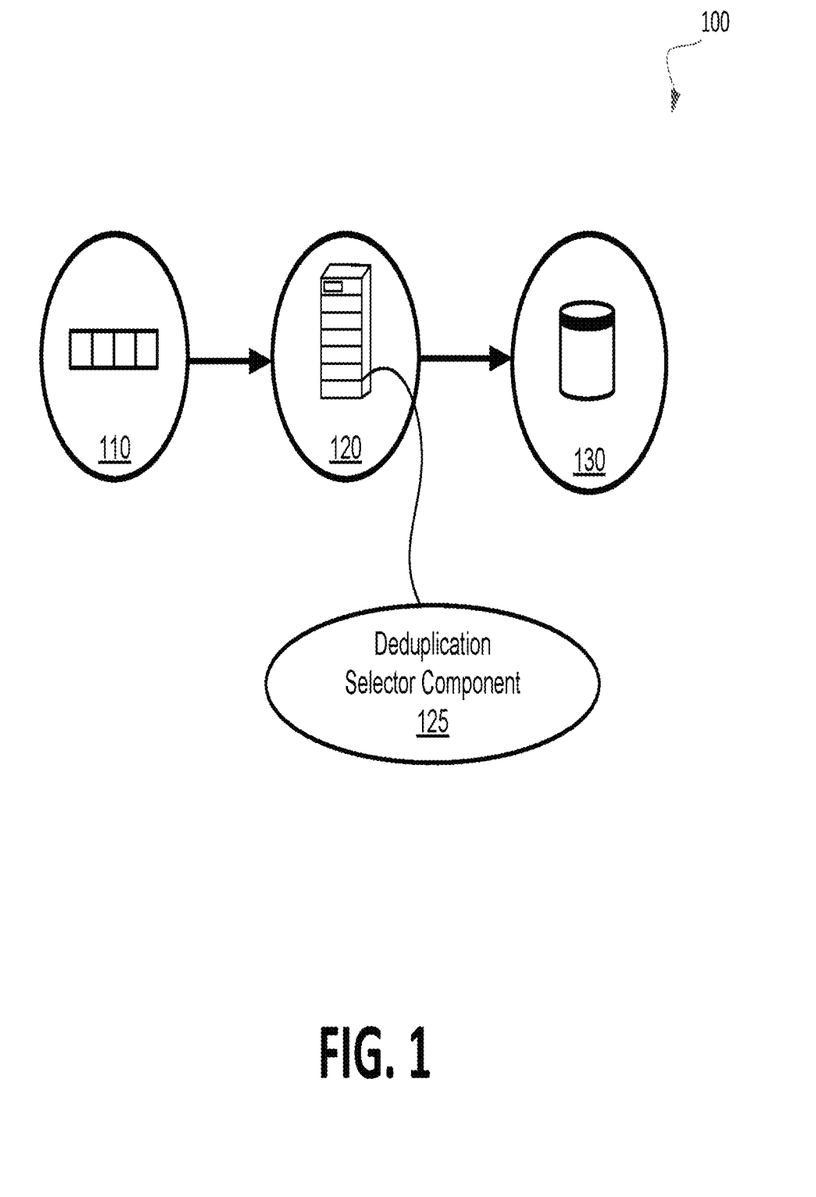
FIG. 1 illustrates an example environment, to select a deduplication process based on a difference between performance metrics in accordance with some embodiments of the present disclosure.

FIG. 1 illustrates an example environment 100 to select a deduplication process based on a difference between performance metrics. In general, the environment 100 may include a storage server 120 that includes a deduplication selector component 125 that receives a stream or series of data blocks 110 for storing in a storage resource 130.

The deduplication process may be an inline data deduplication process where a data block is received and then analyzed before being stored in the storage resource 130. For example, the data deduplication process may determine whether copies of the data blocks 110 that are received are currently stored in the storage resource 130 (e.g., a solid-state non-volatile memory such as flash memory) before storing the received data blocks 110 in the storage resource 130. Thus, the inline data deduplication process may be performed as a stream of data blocks 110 are received to be stored in the storage resource 130.

In general, the deduplication process may receive a data block (e.g., of the series of data blocks) and perform a hash function with the data block to generate a hash value. The hash function may transform the data block of an arbitrary size to data of a fixed size corresponding to the hash value. The deduplication process may store the hash value for comparison with a subsequent data block. For example, when the subsequent data block is received, the hash function, may be performed on the subsequent data block to generate a corresponding hash value based on the contents of the subsequent data block. If the corresponding hash value of the subsequent data block matches the previously stored hash value, then the contents of the subsequent data block may be a copy of the contents of the previously received data block. Instead of storing the contents of the subsequent data block, a pointer to the previously received data block with the matching hash value may be used to replace the contents of the subsequent data block.

As shown in FIG. 1, the deduplication selector component 125 may receive a series of data blocks 110. In some embodiments, the series of data blocks 110 may be a stream of data blocks that are to be stored at storage resources that are managed by a storage system (e.g., flash storage array system or solid-state storage array) that includes the deduplication selector component 125. The deduplication selector component 125 may determine performance metrics for a first and second deduplication process and may select one of the deduplication processes with the received stream of data blocks 110 to determine whether the data blocks of the stream of data blocks 110 are duplicates of other data blocks currently stored at the storage resource 130. The deduplication process may be referred to as an inline deduplication process as the data blocks 110 are analyzed to determine whether a copy or duplicate is currently stored at the storage system before storing the data blocks 110.

Figure 2:
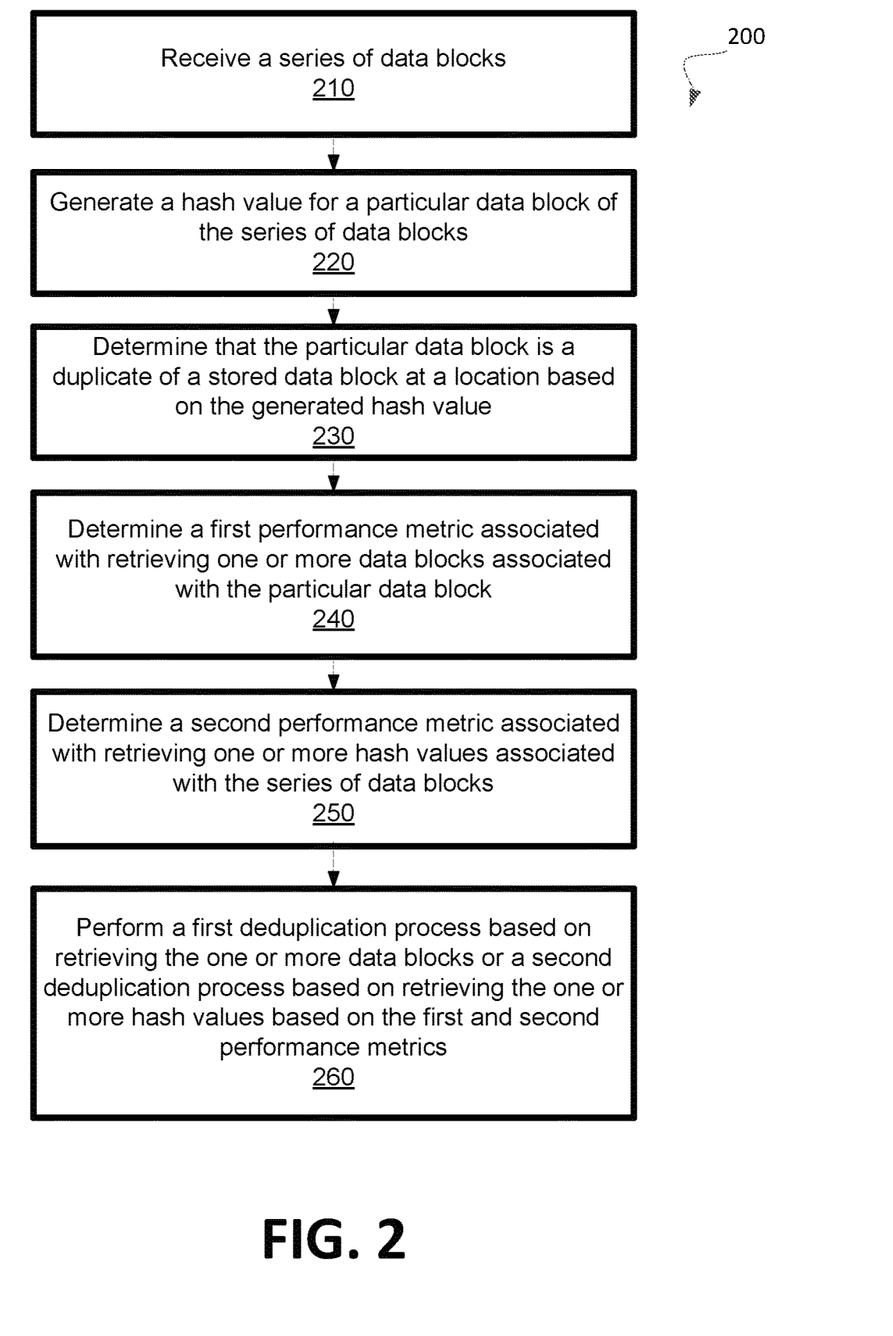
FIG. 2 illustrates an example method to select a deduplication process in accordance with some embodiments of the present disclosure.

As described in further detail with regard to FIG. 2, the deduplication selector component 125 may calculate a first performance metric for a first deduplication process and a second performance metric for a second deduplication process and compare the first and second performance metrics to determine which deduplication process to select to use for determining whether a copy of the series of data blocks 110 is currently stored in the storage resource 130. The deduplication selector component 125 may be implemented by a computer system or storage controller of a flash storage array system. In some embodiments, the deduplication selector component 125 may be implemented by processing logic that may include hardware (e.g., processing device, circuitry, dedicated logic, programmable logic, microcode, hardware of a device, integrated circuit, etc.), software (e.g., instructions n or executed on a processing device), or a combination thereof.

The storage resource 130 may correspond to non-disk storage media that is managed by or coupled with the deduplication selector component 125. For example, the storage resource 130 may be one or more solid-state drives (SSDs), flash memory based storage, any type of solid-state non-volatile memory, or any other type of non-mechanical storage device. In some embodiments, the storage resource 130 may be a storage device that includes a flash memory.

FIG. 2 illustrates an example method 200 to select a deduplication process. In general, the method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the deduplication selector component 125 of FIG. 1 may perform the method 200.

As shown in FIG. 2, the method 200 may begin with the processing logic receiving a series of data blocks (block 210). For example, a group of data blocks may be received as part of a write operation provided to a storage system to store the group of data blocks at a storage resource that is managed by the storage system. Thus, multiple data blocks may be received and subjected to a deduplication process before any of the multiple data blocks are stored at the storage resource. The processing logic may further generate a hash value for a particular data block of the series of data blocks (block 220). For example, a hash function may be used to generate a hash value based on at least one of the data blocks of the series of data blocks. Thus, a subset of the received data blocks, or one data block of multiple data blocks, may be used to generate a first hash value. The processing logic may further determine that the particular data block is a duplicate of a stored data block at a location based on the generated hash value (block 230). For example, the generated hash value may be compared with hash values of a deduplication map that stores hash values for data blocks that are currently stored at the storage resource of the storage system. Further details with regard to the deduplication map are described in conjunction with FIG. 3.

The processing logic may determine a first performance metric associated with retrieving one or more data blocks associated with the particular data block (block 240). The first performance metric may be based on retrieving data blocks that are proximate (e.g., logically proximate in a logical space or physically proximate at the storage resource) to the particular data block at the location at the storage resource of the storage system that is identified by the generated hash value. For example, the data blocks may be in a particular range of data blocks that includes the particular data block or is around the particular data block. The retrieving of the data blocks may be based on retrieving the data, blocks from a cache memory of the storage system and/or from a storage resource of the storage system. For example, the data blocks may be retrieved from the cache memory instead of the storage resource when the respective data blocks are currently stored at the cache memory. Thus, the first performance metric may be based on whether data blocks that are to be retrieved are currently stored at the cache memory or the storage resource. The first performance metric may indicate a better performance (e.g., less time to perform a first deduplication process) when more data blocks to be retrieved are currently stored at the cache memory. Further details with regards to determining a performance metric are described in conjunction with FIGS. 5A and 5B.

Furthermore, the processing logic may determine a second performance metric associated with retrieving one or more hash values associated with the series of data blocks (block 250). The second performance metric may be based on retrieving hash values that are stored in a deduplication map and generating hash values for the other data blocks of the series of data blocks. Furthermore, the second performance metric may similarly indicate a better performance (e.g., less time to perform a second deduplication process) when more hash values of the deduplication map that are to be retrieved are currently stored at the cache memory instead of the storage resource.

Referring to FIG. 2, the processing logic may subsequently perform a first deduplication process based on retrieving the one or more data blocks or a second deduplication process based on retrieving the one or more hash values based on the first and second performance metrics (block 260). For example, the first deduplication process may be selected to be performed to perform the deduplication process with the other data blocks of the series of data blocks when the first performance metric indicates that the first deduplication process may be more efficient (e.g., take less time to perform) than the second deduplication process. The first performance metric may indicate a first amount of time to perform the first deduplication process and the second performance metric may indicate a second amount of time to perform the second deduplication process. The deduplication process that is associated with a lesser amount of time to perform the respective deduplication process may be selected to be performed.

Figure 3:
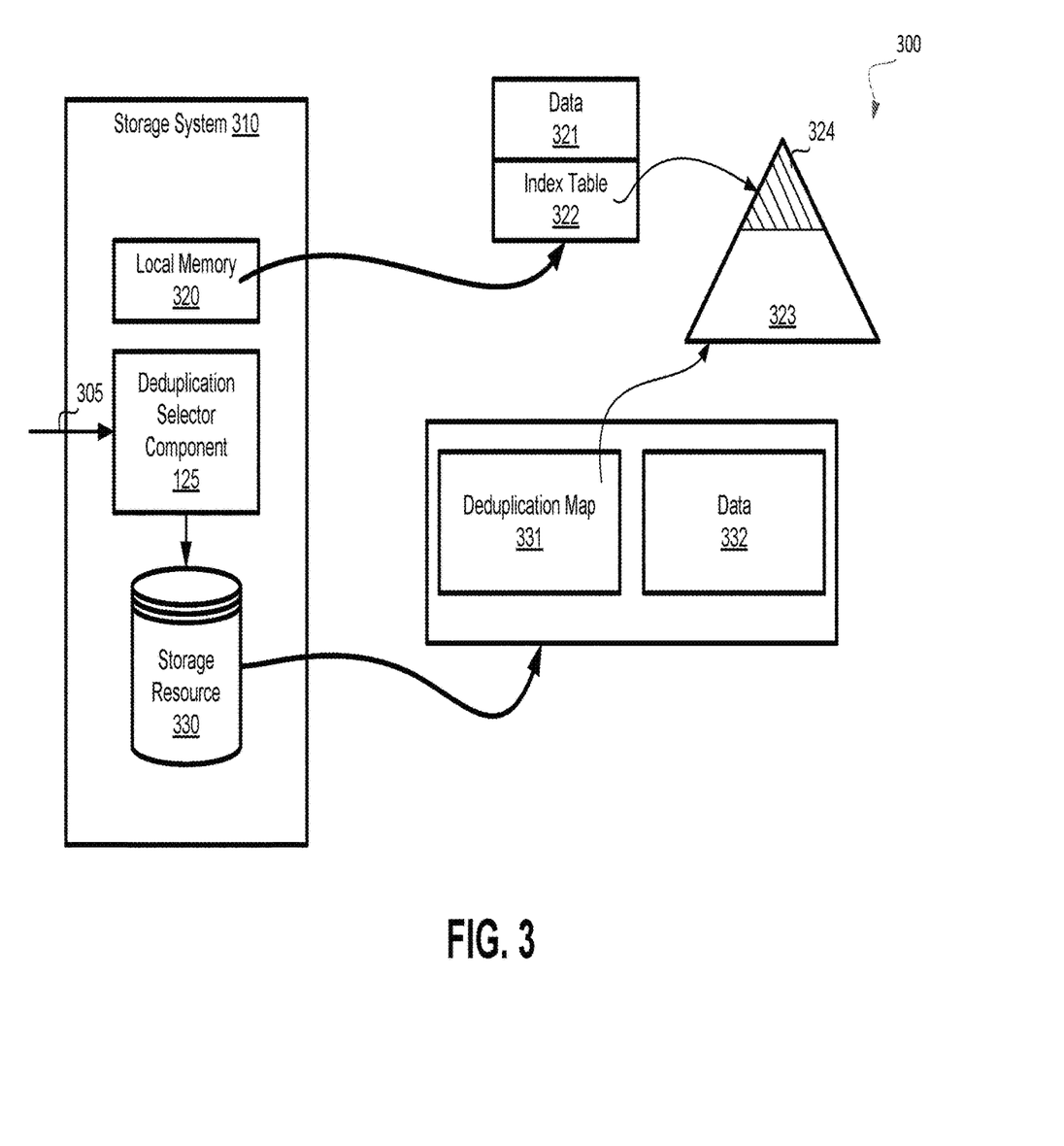
FIG. 3 is an example environment 100 with a storage system that is associated with a local memory and a storage resource for storing data blocks and hash values of a deduplication map in accordance with some embodiments.

FIG. 3 illustrates an example environment 300 with a storage system that is associated with a local memory and a storage resource for storing data blocks and hash values of a deduplication map. In general, the environment 300 may include a storage system 310 with the deduplication selector component 125 of FIG. 1.

As shown in FIG. 3, the storage system 310 may include a cache memory or local memory 320 (e.g., DRAM) and a backing storage or storage resource 330 (e.g., a solid-state non-volatile memory such as flash memory). The storage system 310 may be a solid-state storage array system such as, but not limited to, a flash storage array system. The local memory 320 may store a portion of hash values in an index table 322 and a portion of data 321 and the storage resource 330 may store a deduplication map 331 and data 332. In general, the storage system 310 may receive data blocks 305 and store the data blocks in the storage resource 330 after the deduplication selector component 125 selects a deduplication process to be performed on the received data blocks. The deduplication process may be selected based on hash values that are stored at the portion of hash values in an index table 322 at the local memory 320 and the deduplication map 331 at the storage resource 330 as well as the data blocks at the portion of data 321 stored at the local memory 320 and the data blocks at the data 332 stored at the storage resource 330. The portion of hash values in the index table 322 may be a subset or a portion of the hash values recorded in the deduplication map 331. For example, the portion of hash values in the index table 322 may be hash values that have been recently generated by the storage system 310 for prior received data blocks and are currently stored in the local memory (i.e., the cache) of the storage system 310. Furthermore, the portion of data 321 may correspond to a subset or portion of data blocks that are stored at the data 332. For example, the portion of data 321 may be data blocks that have been recently received by the storage system for storage at the storage resource 330.

In operation, a series of data blocks 305 may be received by the deduplication selector component 125 of the storage system 310 to be stored at the storage resource 330. In response to receiving the data blocks 305, a deduplication process may be selected by the deduplication selector component 125 as described in conjunction with FIG. 2 and FIGS. 4-5B. The selected deduplication process may be used to determine whether a copy of the data block from the data blocks 305 has already been stored at the storage resource 330. For example, the data block may either be compared with another data block received from the local memory 320 or the storage resource 330 or a hash value may be generated for the data block and a hash value may be retrieved from the deduplication map 331 or the local memory 320 and the generated hash value may be compared with the retrieved hash value. If the comparison of data blocks results in the received data block matching the retrieved data block or if the generated hash value matches with the retrieved hash value, then the data block may be considered a duplicate of the data block stored at the storage resource 330. Instead of storing the contents of the received data block, the data block may be stored at the storage resource 330 by creating a pointer to a physical location of the copy of the data block at the storage resource 330. Otherwise, if the data block is not considered a duplicate of another data block stored at the storage resource 330, then the data block may be stored in the storage resource 330 and an entry of the deduplication map 331 may be modified to register the data block by including a hash value of the data block and the physical location in the storage resource 330 where the data block has been stored in an entry.

Although aspects of the present disclosure relate to inline data deduplication, the disclosure herein may be applied to post-processing data deduplication that may be used to analyze data blocks currently stored on the storage resource 330. For example, the post-processing deduplication may analyze each data block that is currently stored on the storage resource 330 to determine whether the corresponding data block is a copy or duplicate of another data block currently stored on the storage resource 330.

Thus, data blocks and hash values may be stored in a local memory and a storage resource. A deduplication process may be selected based on a distribution of the data blocks and hash values in the local memory and the storage resource.

Figure 4:
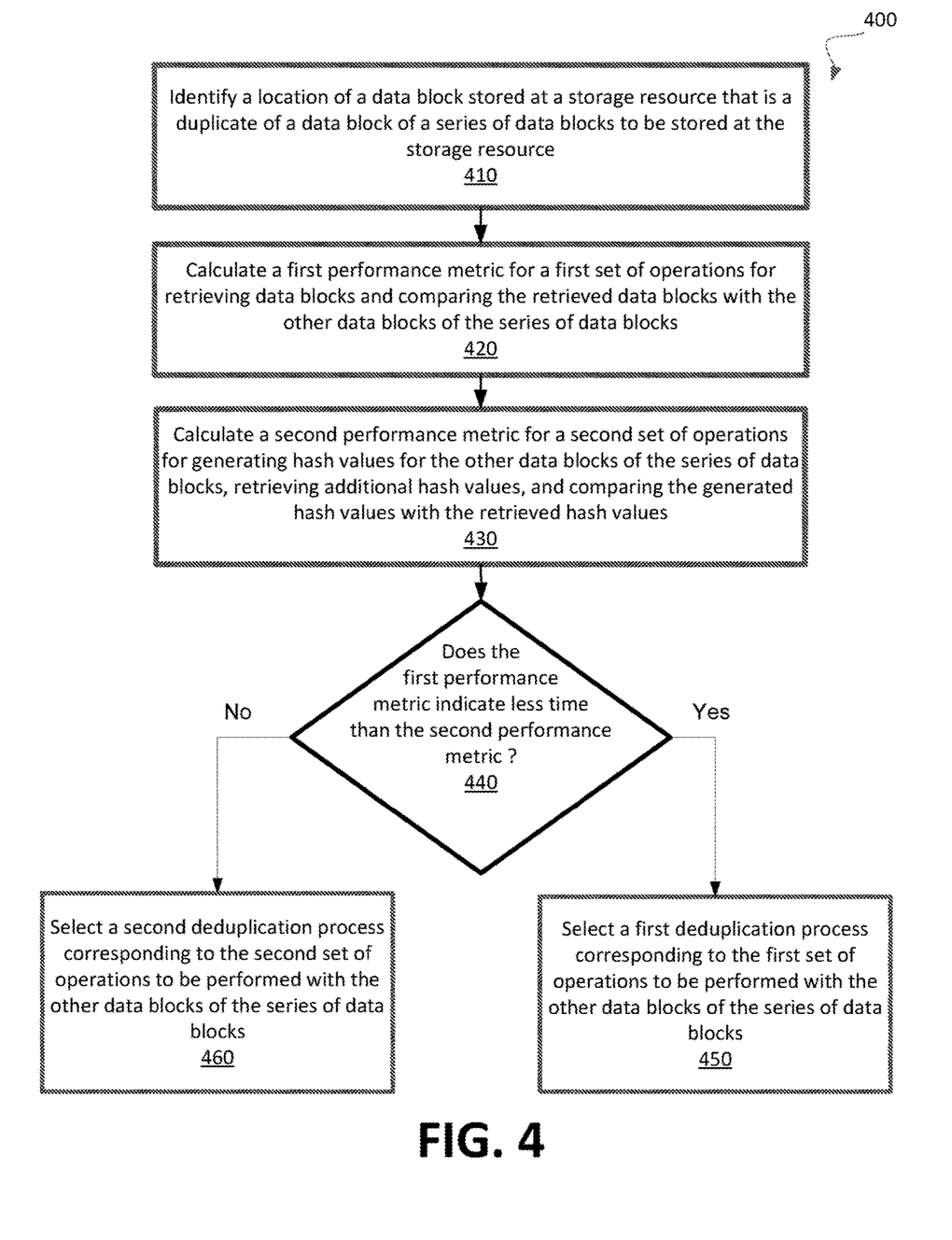
FIG. 4 is an example method to select a first deduplication process based on retrieving data blocks or a second deduplication process based on retrieving hash values in accordance with some embodiments.

FIG. 4 is an example method 400 to select a first deduplication process based on retrieving data blocks or a second deduplication process based on retrieving hash values. In general, the method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the deduplication selector component 125 of FIG. 1 may perform the method 400.

As shown in FIG. 4, the method 400 may begin with the processing logic identifying a location of a data block stored at a storage resource that is a duplicate of a data block of a series of data blocks (block 410). For example, the series of data blocks may be received to be stored at the storage resource and at least one of the data blocks may be determined to be a duplicate of another data block currently stored at the storage resource. The location may be determined by using a hash value of the data block as previously described. The processing logic may further calculate a first performance metric for a first set of operations for retrieving data blocks and comparing the retrieved data blocks with the other data blocks of the series of data blocks (block 420). The first set of operations may correspond to the first deduplication process. The retrieved data blocks may correspond to data blocks that are proximate to the data block that is a duplicate. In some embodiments, the retrieved data blocks may correspond to data blocks that are proximate in logical space to the data block that is a duplicate. In the same or alternative embodiments, the retrieved data blocks may correspond to data blocks that are physically proximate in the storage resource to the data block that is a duplicate. For example, the data blocks may be retrieved from the storage resource or may be retrieved from a cache memory. In some embodiments, when the data blocks are stored at both the cache memory and the storage resource, the data blocks may be retrieved from the cache memory instead of the storage resource. The processing logic may further calculate a second performance metric for a second set of operations for generating hash values for the other data blocks of the series of data blocks, retrieving additional hash values, and comparing the generated hash, values with the retrieved hash values (block 430). The second set of operations may correspond to the second deduplication process. The retrieved hash values may correspond to hash values for the data blocks that are proximate to the data block that is a duplicate. The hash values may be retrieved from the cache memory when the respective hash values are present in the local memory and the hash values may be retrieved from the storage resource when the respective hash values are not present in the local memory.

Referring to FIG. 4, the processing logic may further determine whether the first performance metric indicates less time than the second performance metric (block 440). If the first performance metric indicates that the first set of operations may be performed in less than time than the second set of operations, then the processing logic may select the first deduplication process corresponding to the first set of operations to be performed with, the other data blocks of the series of data blocks (block 450). For example, the first deduplication process may be used to determine whether the other data blocks are duplicates of data blocks stored at the storage resource. Otherwise, if the second performance metric indicates that the second set of operations may be performed in less time than the first set of operations, then the processing logic may select the second deduplication process corresponding to the second set of operations to be performed with the other data blocks of the series of data blocks (block 450). For example, the second deduplication process may be used to determine whether the other data blocks are duplicates of data blocks currently stored at the storage system.

Figure 5A:
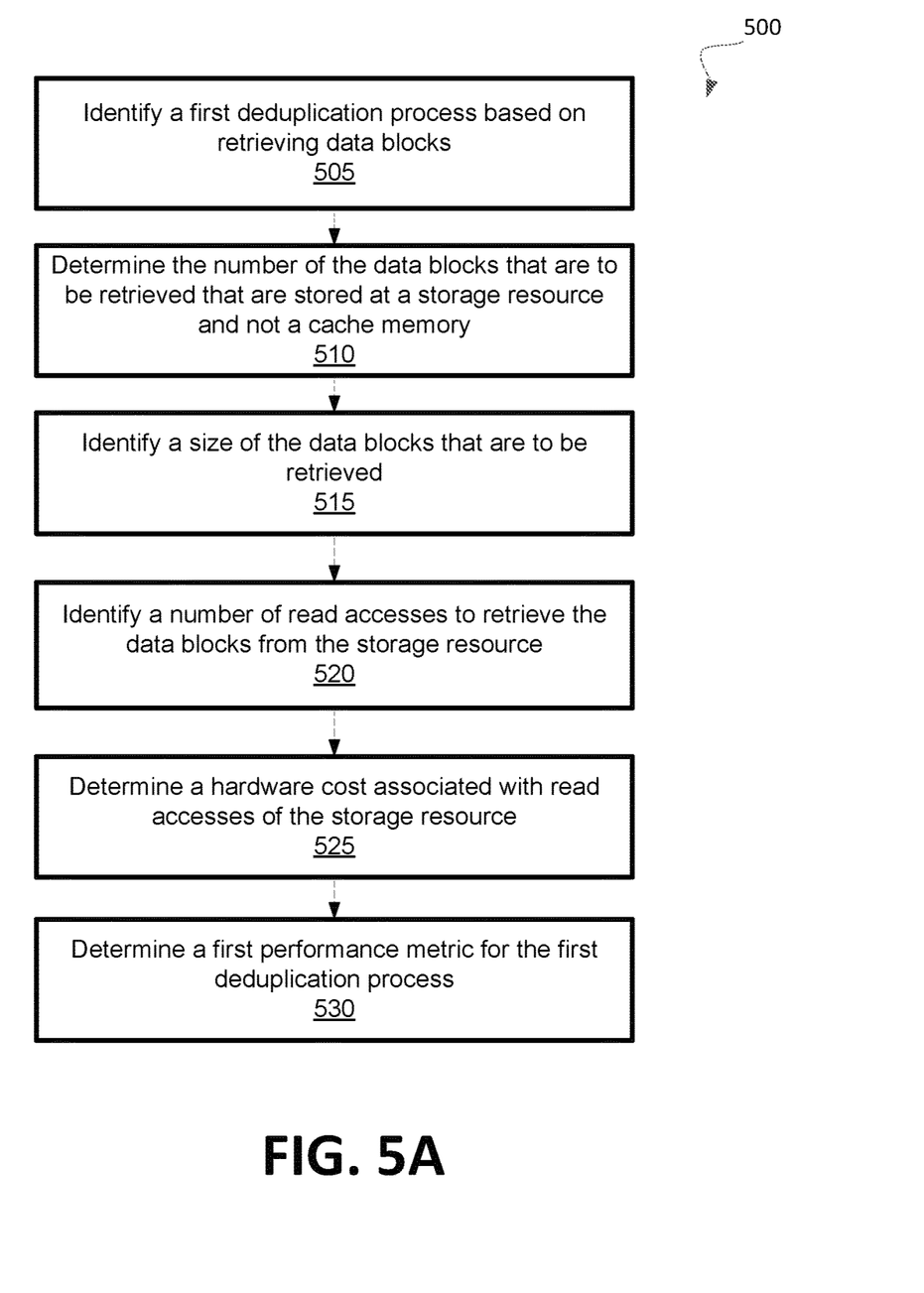
FIG. 5A is an example method to determine a first performance metric for a first deduplication process in accordance with some embodiments of the present disclosure.

FIG. 5A is an example method 500 to determine a first performance metric for a first deduplication process. In general, the method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the deduplication selector component 125 of FIG. 1 may perform the method 500.

As shown in FIG. 5A, the method 500 may begin with the processing logic identifying a first deduplication process based on retrieving data blocks (block 505). The first deduplication process may be a deduplication process that is available for a storage system that has received a plurality of data blocks to be stored at a storage resource. For example, the first deduplication process may determine whether the received data blocks are duplicates of currently stored data blocks by comparing the received data blocks with the currently stored data blocks after retrieval. The processing logic may subsequently determine the number of the data blocks that are to be retrieved that are stored at a storage resource and not a cache memory (block 510). The processing logic may further identify a size of the data blocks that are to be retrieved (block 515). For example, the size of the data blocks that are to be retrieved from the storage resource may be identified. The processing logic may further identify a number of read accesses to retrieve the data blocks that are to be retrieved from the storage resource (block 520). For example, the data blocks may be stored at various locations within the storage resource and a number of read accesses of the storage resource to retrieve each of the data blocks that are to be retrieved from the storage resource may be identified. Furthermore, the processing logic may determine a hardware cost associated with the read accesses of the storage resource (block 525). The cost may be associated with a network bandwidth and a processing usage to retrieve the data blocks from the storage resource.

Subsequently, the processing logic may determine the first performance metric for the first deduplication process based on the number of data blocks that are to be retrieved from the storage resource, the size of the data blocks, the number of read accesses, and the hardware cost (block 530). In some embodiments, the first performance metric may indicate a longer amount of time to perform the first deduplication process when the number of data blocks to be retrieved from the storage increases, the size of the data blocks increases, the number of read accesses increases, and when the hardware cost corresponds to an increase in network bandwidth and processing usage.

Figure 5B:
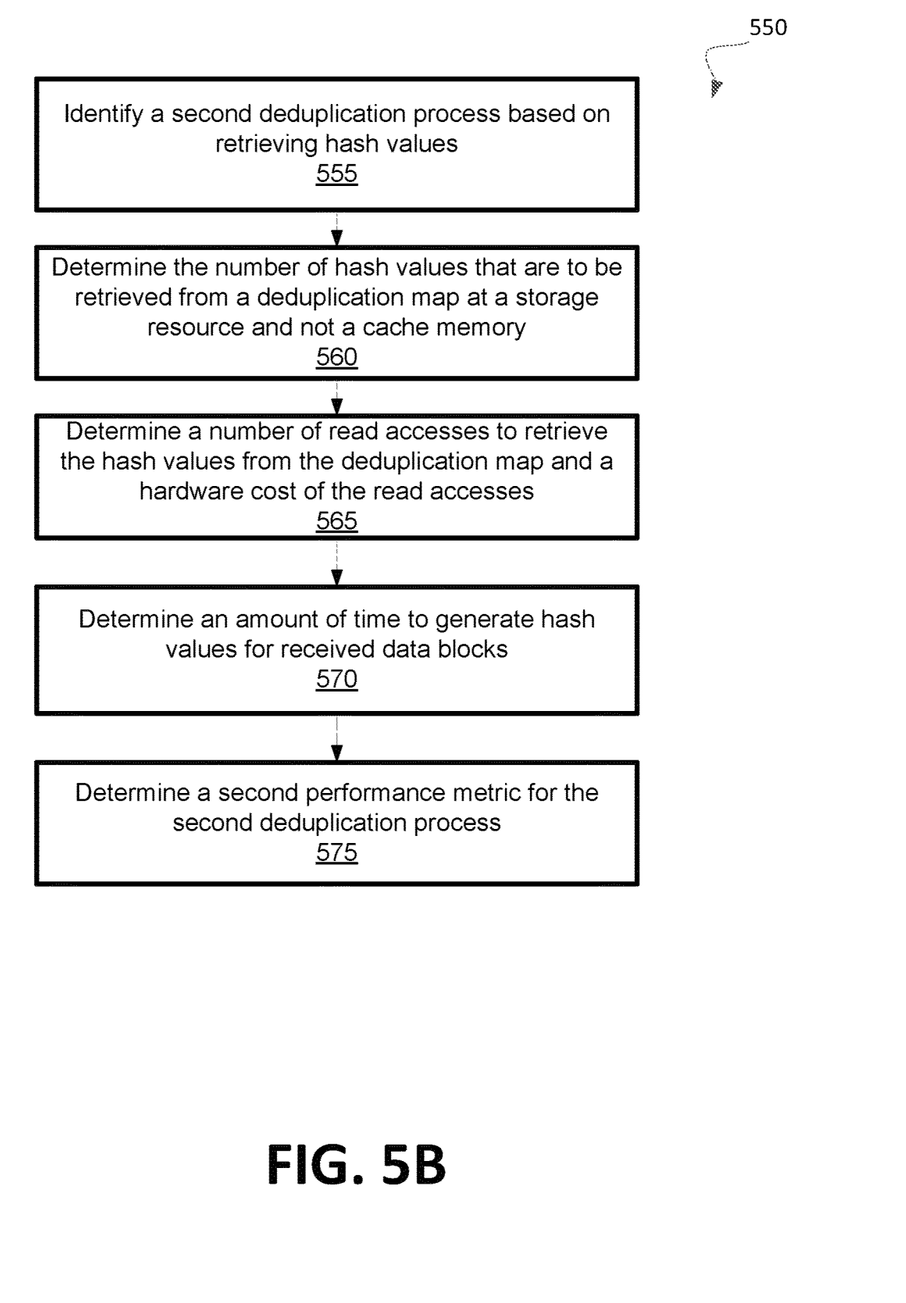
FIG. 5B is an example method to determine a second performance metric for a second duplication process in accordance with some embodiments of the present disclosure.

FIG. 5B is an example method 550 to determine a second performance metric for a second deduplication process. In general, the method 550 may be performed by processing logic that may include hardware (e.g., processing device, circuitry, dedicated logic, programmable logic, microcode, hardware of a device, integrated circuit. etc.), software (e.g., instructions run or executed on a processing device), or a combination thereof. In some embodiments, the deduplication selector component 125 of FIG. 1 may perform the method 550.

As shown in FIG. 5B, the method 550 may begin with the processing logic identifying a second deduplication process based on retrieving hash values (block 555). The processing logic may subsequently identify a number of hash values that are to be retrieved from a deduplication map at a storage resource and not a cache memory (block 560). The processing logic may further determine a number a read accesses to retrieve the hash values from the deduplication map at the storage resource, a cost of the read accesses, and a hardware cost associated with the read accesses (block 565). Furthermore, the processing logic may determine an amount of time to generate hash values for received data blocks (block 570). For example, an amount of time to generate the hash values for received data blocks by a hash function may be received.

Subsequently, the processing logic may determine the second performance metric for the second deduplication process based on the number of hash values that are to be retrieved from deduplication map at the storage resource, the number of read accesses, the hardware cost, and the amount of time to generate the hash values (block 575). In some embodiments, the second performance metric may indicate a longer amount of time to perform the second deduplication process when the number of hash values to be retrieved from the storage increases, the number of read accesses increases, when the hardware cost corresponds to an increase its network bandwidth and processing usage, and when the amount of time to generate the hash values increases.

Figure 6:
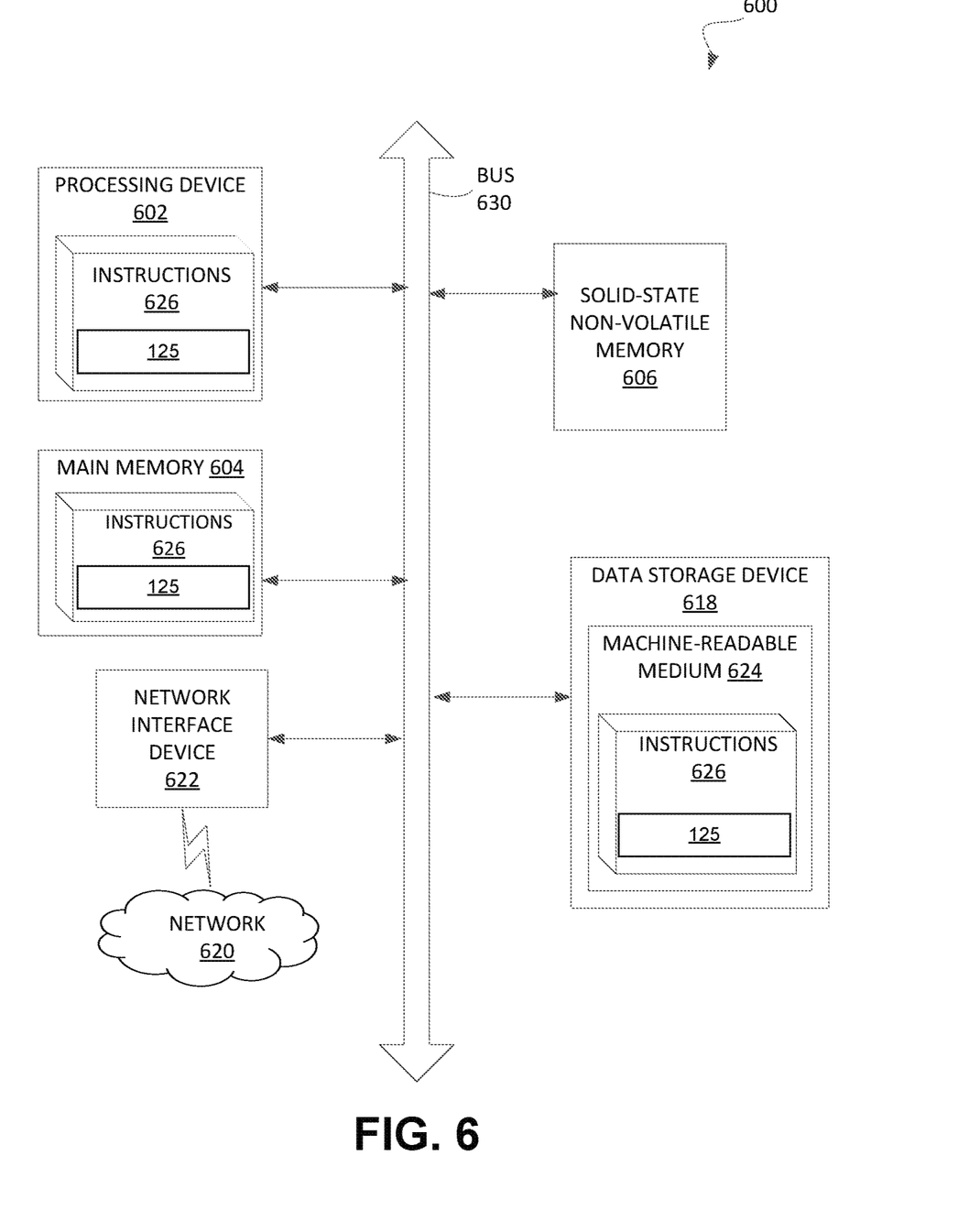
FIG. 6 is a block diagram of an example computer system operating in accordance with the disclosure described herein.

FIG. 6 depicts an example computer system 600 which can perform any one or more of the methods described herein. The computer system may be connected (e.g., networked) to other computer systems in a LAN, an intranet, extranet, or the Internet. The computer system may operate in the capacity of a server in a client-server network environment. The computer system may be a personal computer (PC), a set-top box (STB), a server, a network router, switch or bridge, a storage system, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a solid-state non-volatile memory 606 (e.g., flash memory, 3D crosspoint (XPoint) memory, magnetoresistive random-access memory (MRAM), or any other such storage media that does not use a physical disk), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the deduplication selector component 125 of FIG. 1 for performing the operations and steps discussed herein. The computer system 600 may further include a network interface device 622. The data storage device 616 may include a computer-readable medium 624 on which is stored the deduplication selector component 125 embodying any one or more of the methodologies or functions described herein. The deduplication selector component 125 may also reside, completely or at least partially, within the main memory 604 and/or within the processing device 602 during execution thereof by the computer system 600, the main memory 604 and the processing device 602 also constituting computer-readable media. The deduplication selector component 125 may further be transmitted or received over a network via the network interface device 622.

While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not he limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving" "determining," "performing," "using," "registering," "recording" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks. CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system for other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. As used herein are meant as labels to distinguish among different elements and may not necessarily have an ordinal meaning according to their numerical designation.

What is claimed is:

1. A system comprising: a processing device to: determine a first performance metric associated with a processing time of retrieving a second stored data block that is within a specified range of a duplicate of a first data block and a second performance metric associated with a processing time of retrieving a hash value corresponding to the second stored data block; decide, based on the first performance metric and the second performance metric, between a first process of retrieving data blocks and a second process of retrieving hash values for performing a deduplication process; and retrieve the second stored data block within a specified range of the duplicate of the first data block in response to the second performance metric exceeding the first performance metric, to perform the deduplication process with the first process of retrieving data blocks.

2. The system of claim 1, wherein the processing device is further to:
in response to the first performance metric exceeding the second performance metric:
generate another hash value for a second data block of a received plurality of data blocks to perform a deduplication operation by comparing a retrieved second hash value corresponding to the second stored data block with the generated another hash value, the second data block being a duplicate of the second stored data block stored at a storage resource when the second hash value matches with the another hash value.

3. The system of claim 1, wherein the processing device is further to:
in further response to the second performance metric exceeding the first performance metric, perform a deduplication operation by comparing the second stored data block with another data block of the received plurality of data blocks.

4. The system of claim 1, wherein the second performance metric exceeds the first performance metric when an amount of time based on retrieving the second hash value exceeds an amount of time based on retrieving the second stored data block.

5. The system of claim 1, wherein the first performance metric is based on whether the second stored data block is stored in a cache memory and wherein the second performance metric is based on whether the second hash value is stored in the cache memory.

6. The system of claim 1, wherein the second stored data block is in a range of data blocks stored at the storage resource that includes the first data block.

7. The system of claim 1, wherein the second stored data block that is in the specified range of the duplicate of the first data block is in the specified range in a logical space associated with the duplicate of the first data block.

8. A non-transitory computer readable storage medium storing instructions, which when executed, cause a processing device to:
determine a first performance metric associated with a processing time or hardware cost of retrieving a second stored data block that is within a specified range of a duplicate of a first data block and a second performance metric associated with a processing time or hardware cost of retrieving a hash value corresponding to the second stored data block;
decide, based on the first performance metric and the second performance metric, between a first process of retrieving data blocks and a second process of retrieving hash values for performing a deduplication process; and
retrieve the second stored data block within a specified range of the duplicate of the first data block, in accordance with performing the deduplication process with the first process of retrieving data blocks, in response to the second performance metric exceeding the first performance metric.

9. The non-transitory computer readable storage medium of claim 8, wherein the processing device is further to:
in response to the first performance metric exceeding the second performance metric:
generate another hash value for a second data block of a received plurality of data blocks to perform a deduplication operation by comparing a retrieved second hash value corresponding to the second stored data block with the generated another hash value, the second data block being a duplicate of the second stored data block stored at a storage resource when the second hash value matches with the another hash value.

10. The non-transitory computer readable storage medium of claim 8, wherein the processing device is further to:
in further response to the second performance metric exceeding the first performance metric, perform a deduplication operation by comparing the second stored data block with another data block of a received plurality of data blocks.

11. The non-transitory computer readable storage medium of claim 8, wherein the second performance metric exceeds the first performance metric when an amount of time based on retrieving the second hash value exceeds an amount of time based on retrieving the second stored data block.

12. The non-transitory computer readable storage medium of claim 8, wherein the first performance metric is based on whether the second stored data block is stored in a cache memory and wherein the second performance metric is based on whether the second hash value is stored in the cache memory.

13. The non-transitory computer readable storage medium of claim 8, wherein the second stored data block is in a range of data blocks stored at a storage resource that includes the first data block.

14. The non-transitory computer readable storage medium of claim 8, wherein the second stored data block that is in the specified range of the duplicate of the first data block is in the specified range in a logical space associated with the duplicate of the first data block.

\* \* \* \* \*